(12) United States Patent
Möller et al.

(10) Patent No.: US 8,083,446 B2
(45) Date of Patent: Dec. 27, 2011

(54) SPINDLE HAVING A DATA ACQUISITION ELEMENT WHICH CAN BE READ BY A RADIO

(75) Inventors: Bernd Möller, Hersbruck (DE); Edgar Verlemann, Nürnberg (DE)

(73) Assignee: Paul Müller GmbH & Co. KG Unternehmensbeteiligungen, Nürnberg (DE)

( * ) Notice: Subject to any disclaimer, the term of this patent is extended or adjusted under 35 U.S.C. 154(b) by 339 days.

(21) Appl. No.: 11/991,717

(22) PCT Filed: Aug. 11, 2006

(86) PCT No.: PCT/DE2006/001404
§ 371 (c)(1),
(2), (4) Date: Dec. 8, 2008

(87) PCT Pub. No.: WO2007/031048
PCT Pub. Date: Mar. 22, 2007

(65) Prior Publication Data
US 2009/0267429 A1     Oct. 29, 2009

(30) Foreign Application Priority Data
Sep. 12, 2005 (EP) .................... 05019759

(51) Int. Cl.
*B23C 1/00* (2006.01)
*B23Q 5/10* (2006.01)
*B23Q 11/00* (2006.01)
*B23Q 15/00* (2006.01)

(52) U.S. Cl. ........ 409/231; 409/233; 409/207; 409/134; 408/8; 700/170; 700/174; 700/177

(58) Field of Classification Search .......... 409/231–233, 409/80, 186, 187, 193–194, 207–208, 134; 408/8, 9, 239 R, 239 A; 700/170, 174–175, 700/177
See application file for complete search history.

(56) References Cited

U.S. PATENT DOCUMENTS

| | | | |
|---|---|---|---|
| 4,761,101 A | 8/1988 | Zettl | |
| 6,297,747 B1 * | 10/2001 | Magori et al. | 340/870.28 |
| 7,011,631 B2 | 3/2006 | Davis et al. | |
| 7,710,287 B2 * | 5/2010 | Lange et al. | 700/175 |
| 2003/0103827 A1 * | 6/2003 | Moller et al. | 409/231 |
| 2006/0085092 A1 * | 4/2006 | Redecker et al. | 700/174 |

OTHER PUBLICATIONS

DE 100 07 126, Sep. 2001, Germany (ISR) (With English Abstract) (=US 7,011,631).
FR 2 582 126, Nov. 1986, France (ISR) (With English Abstract).
DE 19 54 643, Jun. 1970, Germany (ISR).
International Search Report, from PCT/DE2006/001404, dated Nov. 23, 2006.

* cited by examiner

*Primary Examiner* — Erica E Cadugan
(74) *Attorney, Agent, or Firm* — Collard & Roe, P.C.

(57) ABSTRACT

The invention relates to a spindle for a machine tool, in particular a motor spindle having a housing (2) for accommodating an electric motor (3) and a shaft (6) which can be driven by the latter, in particular having a tool holder for a tool for machining workpieces, wherein at least one data acquisition element (8) for recording operating and/or state data of the spindle is provided, and wherein the data acquisition element is in the form of a radio chip and can be read by radio using a read element (9).

8 Claims, 6 Drawing Sheets

Figure 1:
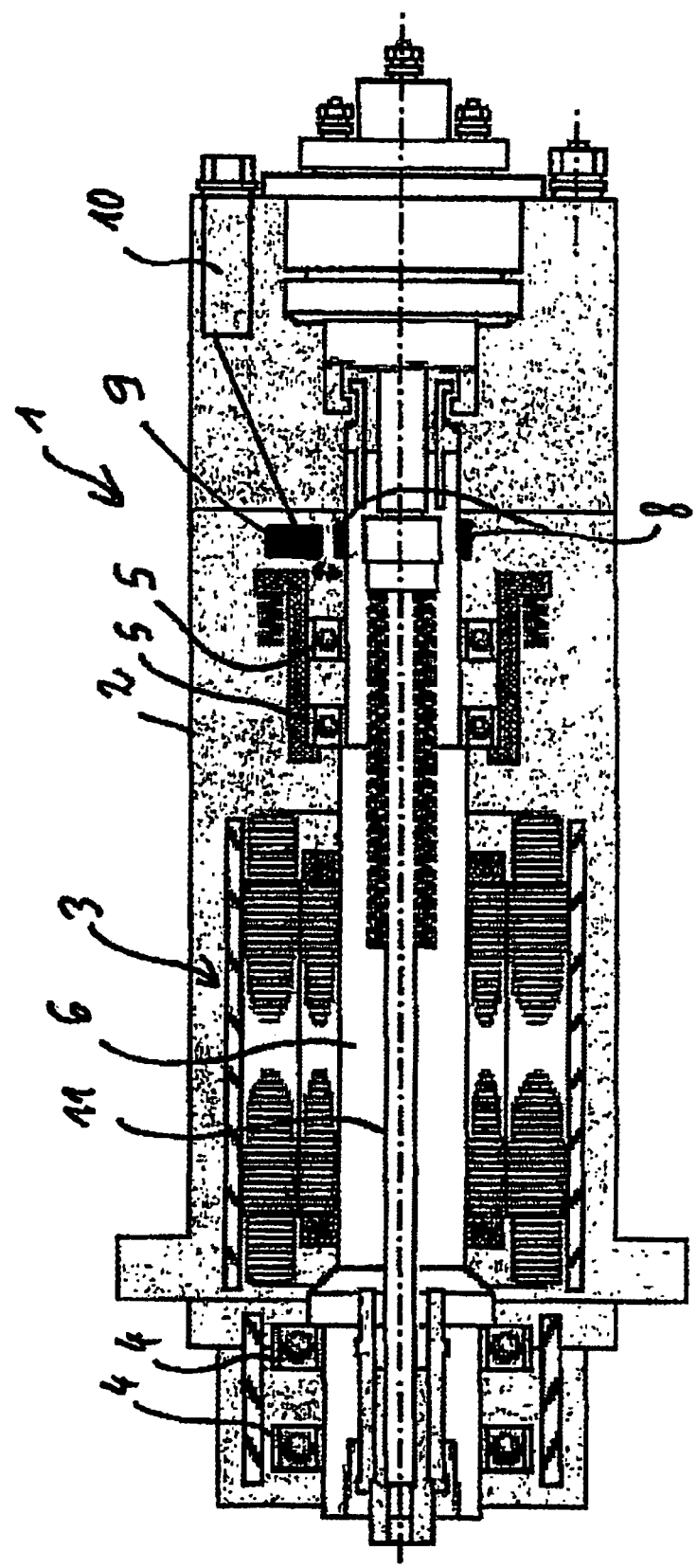

Arrangement wherein the Motor
Spindle includes a plurality of Radio
Chips, some of which can be Read by
an Internal Read Element, and Some of
Which can be Read by an External Read
Element

Fig. 7

SPINDLE HAVING A DATA ACQUISITION ELEMENT WHICH CAN BE READ BY A RADIO

CROSS REFERENCE TO RELATED APPLICATIONS

This application is the National Stage of PCT/DE2006/001404 filed on Aug. 11, 2006, which claims priority under 35 U.S.C. §119 of European Application No. 05019759.9 filed on Sep. 12, 2005. The international application under PCT article 21(2) was not published in English.

The invention relates to a spindle having the features of a data acquisition element being in the form of a radio chip and being able to be read by radio via a read element.

The invention is based on the object of providing a spindle for a machine tool, in which recorded operating and/or state data can be read particularly advantageously.

This object is achieved by a spindle having the features of a data acquisition element being in the form of a radio chip and being able to be read by radio via a read element, in conjunction with the features of a spindle for a machine tool, in particular a motor spindle having a housing for holding an electric motor and a shaft which can be driven by it, in particular having a tool holder for a tool for workpiece machining, with at least one data acquisition element being provided in order to receive operating and/or state data relating to the spindle. Advantageous embodiments of the invention are specified with features such as the radio chip not having its own power supply, and the radio chip being supplied with appropriate power for reading via the radio waves of the read element; the spindle having an integrated read element for reading a radio chip within the spindle; the read element being able to be connected to a machine controller for the machine tool; the read element being intended to read the radio chip of the same spindle and to read the radio chips of adjacent spindles; an external read element being provided in order to read a radio chip within the spindle; the radio chip having a data area which can be read only by the external read element and not by the integrated read element for that spindle; the spindle having a plurality of radio chips, some of which can be read by an internal read element, and some of which can be read by an external read element; and the read element having a plurality of separate radio signals, which can be selected, in order to separately read different radio chips.

The spindle according to the invention has a data acquisition element which is in the form of a radio chip and can be read by radio via a read element. There is therefore no longer any need for a cable-based connection in order to read the data acquisition element.

According to one advantageous embodiment, the radio chip does not have its own power supply, and the radio chip is supplied with appropriate power for reading via the radio waves of the read element. In this case, the radio chip may be in the form of a passive RFID (radio-frequency identification detector) element.

In RFID elements, a reader/writer emits electromagnetic waves and thus produces an electromagnetic field (radio transmitter). If an object which is identified by a special label, a so-called transponder, is located in the electromagnetic field, it behaves as a receiver.

During this process, the transponder receives power via an antenna coil (induction) and uses this power to transmit the data stored in a microchip back to the reader/writer. Passive RFID elements do not have their own power source and, like the reader/writer, operate both as a receiver and a transmitter.

The data received in this way by the reader/writer can then be passed on to other computer processing applications.

In a further embodiment, the reader may be a mobile reader which may be used by the user of the spindle or by someone who is responsible for repair or servicing of the spindle, is moved from the outside to the vicinity of the spindle, with the data of the data acquisition element therefore being read in the spindle, using radio chips as data acquisition elements.

If a chip element without its own power supply is used as a radio system, there is no need to supply the data acquisition element with power in a corresponding manner from the machine tool or from the machine tool controller. It is therefore also possible to read the data acquisition element of a spindle which has not yet been connected, or has not yet been completely connected, to a machine tool.

According to a further embodiment, the spindle may have an integrated reader in order to read radio chips which are likewise arranged within the spindle.

There is therefore no longer any need for a cable connection between the reader and the element for reading the data, in order to read the data acquisition element.

In one particularly advantageous embodiment, a reader can therefore be provided within the spindle, which communicates by radio waves with elements which are likewise arranged within the spindle, as data acquisition element, specifically as a radio chip, without their own power supply, and reads data acquired in the radio chips.

Data acquisition elements such as these without cables simplify the design of the spindle and the spindle installation.

According to a further advantageous embodiment, the reader can be connected to a machine controller for the machine tool. In the case of a mobile reader, this may be done with or without the use of cables. In the case of a reader which is integrated in the spindle, a connection may be provided, in particular a cable connection, to the machine controller.

According to a further advantageous embodiment, the reader may be used to read the radio chip of a specific spindle, in particular the spindle in which the reader is integrated. Furthermore, one or more further spindles can also be read via a reader. This makes it possible to use a single reader to read a plurality of spindles and the data acquisition elements fitted there. It is therefore possible to read data acquisition elements of spindles with little effort, for example in a machine room with a plurality of machine tools. The radio chip advantageously has a data area which can be read only by an external reader and not by a reader for that spindle. In this embodiment, the spindle with its radio chips can on the one hand be read by a reader integrated in the spindle, with only one specific data area being read. A further data area of the radio chip can be read by a mobile reader of an external person who, for example, is responsible for servicing or for use. Furthermore, the read element may have a plurality of separate radio signals, for example on different radio channels, which can be selected in order to separately read different radio chips within one spindle, or the radio chips of a plurality of spindles. A connection may exist for this purpose between a spindle-integrated read element and the machine controller for the machine tool, in order to control the read element to select the separate radio signals.

This makes it possible to control the access to information within the radio chip from the machine controller or from the operator of the mobile radio, and it is possible to stipulate what data is accessible by whom.

A data acquisition element can store spindle manufacturer data (for example serial number, initial delivery date, guarantee details, performance data, power/torque and rotation speed profiles, parameter sets for CNC control, etc.), which can be read in situ during servicing. If required, the most recent status data before a failure could be stored in conjunction with internal sensor processing for the spindle (if required, an active RFID with its own power supply may be used for this purpose).

Users (for example the final customer) of the spindle may in general have readers for the RFID elements of the spindle and can therefore, for example, use the Internet to transmit additional data to the spindle manufacturer for remote diagnosis. There would be no need to interchange data all the time in this case, but only when required.

The final customer could also use an RFID element for interchanging data with the spindle manufacturer, that is to say the location of use and the machine number could be annotated by the final customer on the RFID element. The spindle manufacturer could use this data to identify at an early stage major fault areas and machine problems at the final customer's premises, and to instruct the customer's works maintenance on these major fault areas.

The spindle can also be provided with two or more RFID elements, one RFID element just for the internal data of the spindle manufacturer (first data area which cannot be overwritten) and one or more RFID elements which can be overwritten by the final customer and the spindle manufacturer.

A single RFID element may also have a first data area which can be overwritten, and a second data area which cannot be overwritten.

RFID elements with appropriate specific data (such as service data) can be installed during final assembly of the spindle at the spindle manufacturer's premises. The storage location and the manufacturing status of this spindle could then be recorded automatically within the storage area at the spindle manufacturer's premises, and could be used appropriately for dispatch and sales purposes.

Figure 2A:
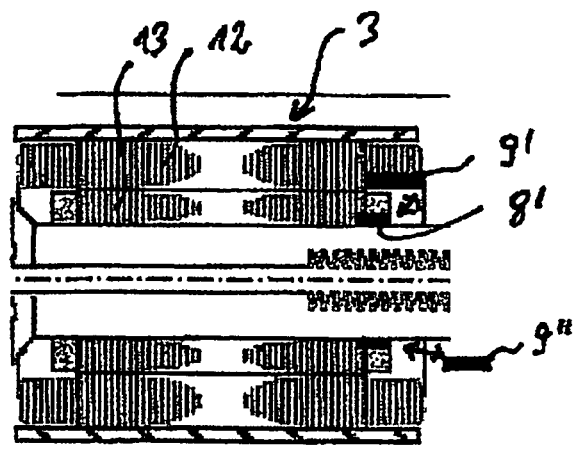
Figure 2B:
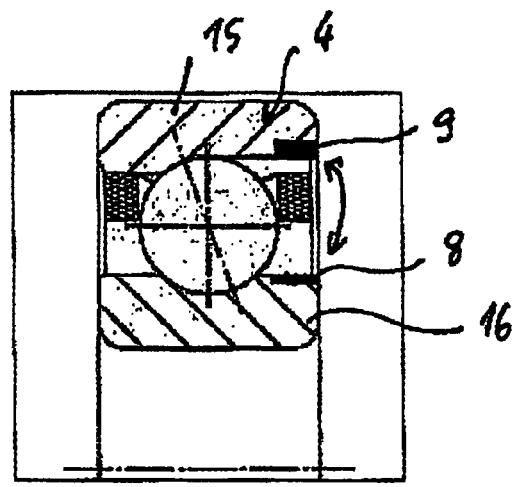
Figure 2C:
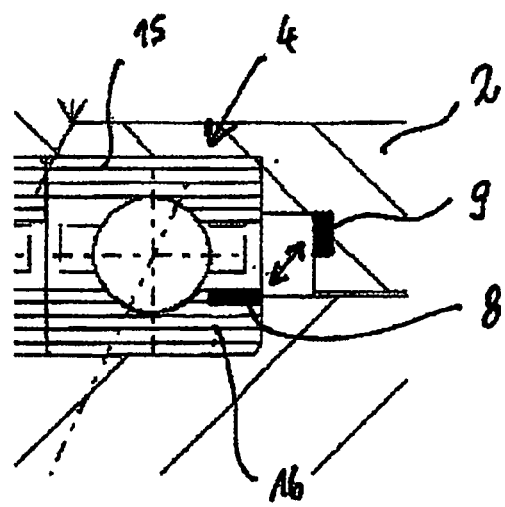
Figure 3:
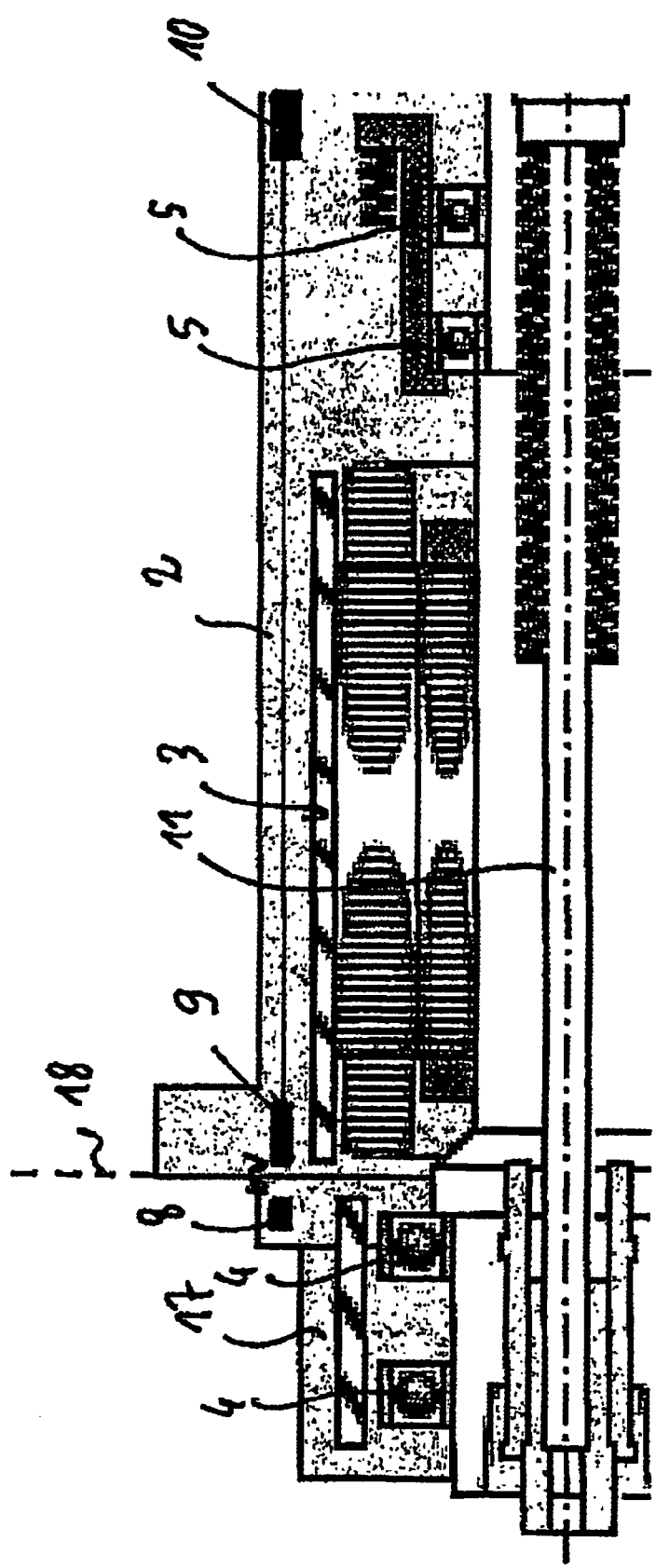
Figure 4:
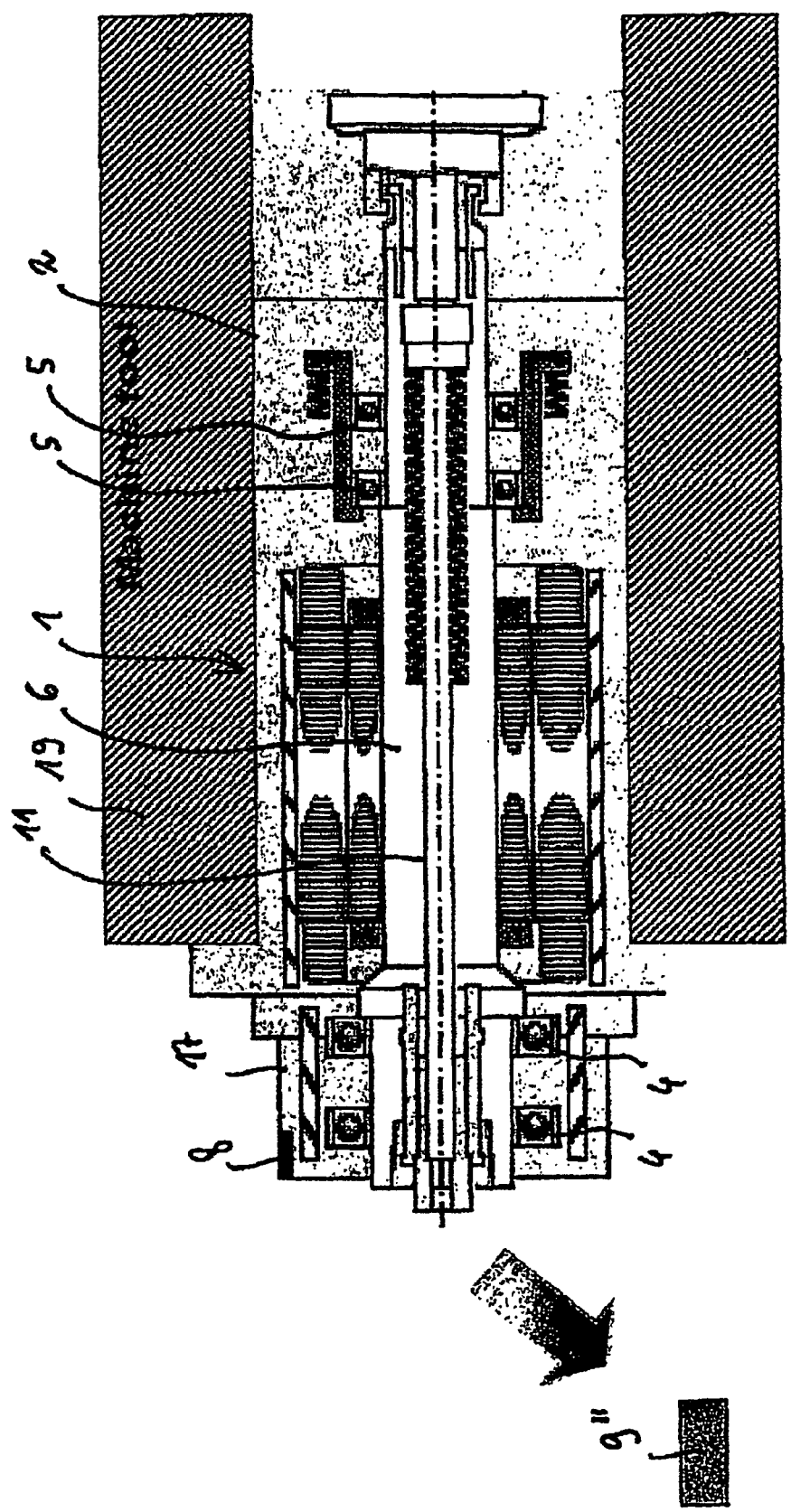

The invention will be explained in more detail using one exemplary embodiment in the drawing figures, in which:

FIG. 1 shows a section illustration of a spindle which can be installed in a machine tool with a machine controller, FIG. 2a shows a first detailed illustration based on FIG. 1, FIG. 2b shows a second detailed illustration based on FIG. 1, FIG. 2c shows a third detailed illustration based on FIG. 1, FIG. 3 shows a further embodiment of a spindle as shown in FIG. 1, in the form of a section illustration, and FIG. 4 shows a section illustration of a spindle which is held in a machine tool and has data acquisition elements which can be read by an external reader.

Figure 5:
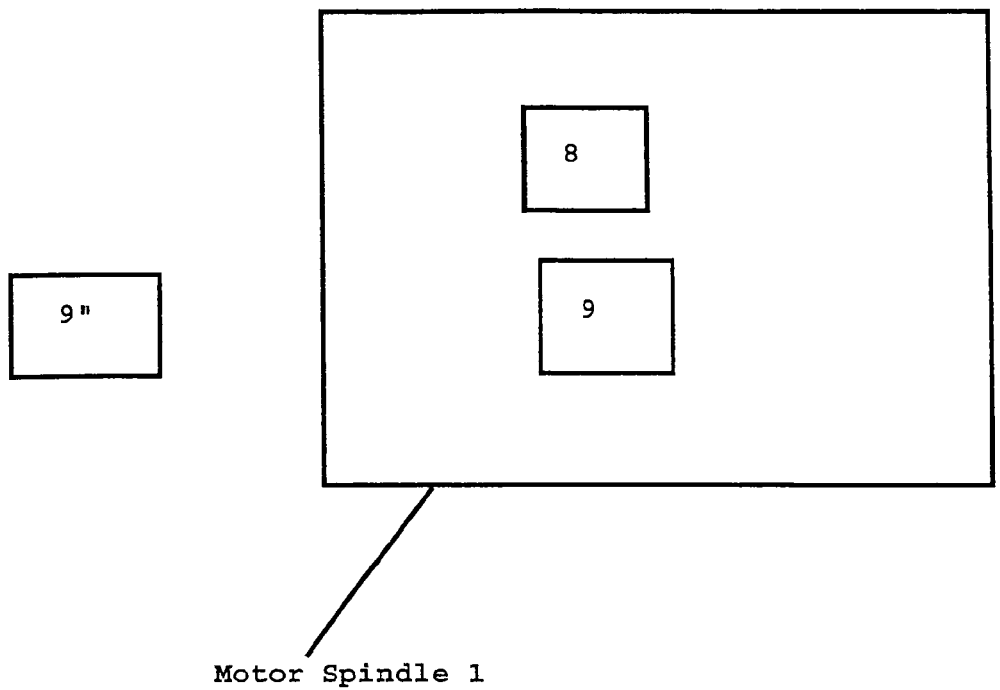

FIG. 5 schematically shows an arrangement according to the present invention.

Figure 6:
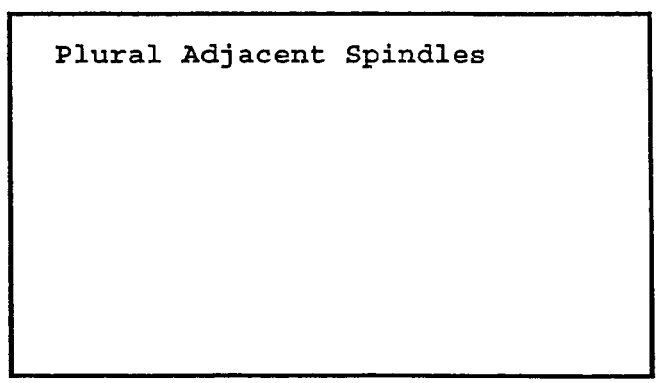

FIG. 6 schematically shows plural adjacent spindles.

FIG. 7 schematically shows an arrangement according to the present invention.

FIG. 1 shows a schematic section illustration of a spindle 1, which is known per se, having a housing 2 in which an electric motor 3 is accommodated, which drives a shaft 6 (which is held in the bearings 4 and 5) with a clamping element for holding a tool, which is not shown. The spindle 1 has a data acquisition element 8, which is integrated in the shaft 6 or is fitted to it, for example such that it revolves, and is in the form of a radio chip. During rotation of the shaft 6, the rotating data acquisition elements 8 can be read by a reader 9 for the spindle 1 (unidirectionally and/or bidirectionally, that is to say pure reading of the data acquisition element 8 and/or writing to the data acquisition element 8 with an integrated memory). The reader 9 is connected, for example by cables, to a further element 10 for data processing and/or storage, and this further element 10 may have an interface to the machine controller, which is not shown, for the machine tool.

The data acquisition element 8 in particular does not have its own power supply and is read by the reader 9 using the transmitted radio waves to provide the required power for the data acquisition element 8. A wire-free data acquisition element 8 such as this can be fitted in components which cannot be accessed by cable-based elements, for example because of the rotation of the component or the space required.

By way of example, the data acquisition element 8 can determine data such as the motor temperature, bearing temperature and/or clamping state (position of the tie rod 11 within the shaft 6, clamped or not clamped).

FIG. 2a shows a further reader 9', which is integrated in the stator 12 (for example in its end winding) of the electric motor 3 for a spindle 1 as shown in FIG. 1. A corresponding data acquisition element 8' (for example for temperature data) which can be read may be integrated in the rotor 13 of the electric motor 3, and may rotate with it. Furthermore, alternatively or additionally, a further reader 9" may be provided, which is arranged outside the stator 12, within the housing 2 of the spindle 1.

FIG. 2b shows further options for integration of a further reader 9, for example in the stationary outer ring 15 of a bearing 4 or 5, while a further data acquisition element 8 is provided in the rotating inner ring 16 of one of the bearings 4 or 5.

As shown in FIG. 2c, a further reader 9 can also be provided in the stationary housing 2 of the spindle 1, and has a radio link to a further data acquisition element 8 in a rotating inner ring 16 of a bearing 4 or 5.

FIG. 3 shows a further option for fitting a reader 9, which is fitted in a first assembly of the spindle 1 (for example its housing 2) and can be detachably connected to a second assembly of the spindle 1.

The second assembly (in this case a bearing cover) has a data acquisition element 8. This allows communication to take place, or data to be read between the reader 9 and the data acquisition element 8, without the use of wires, across the boundary 18 between a plurality of assemblies.

Installation and removal of the spindle 1 are simplified by there being no soldered joints, plug connections and cable connection fits. This also avoids the risk of cable fractures or inadvertent ground faults. This allows interference-free data transmission by radio within the spindle 1.

FIG. 4 shows a spindle 1 which is held in a machine tool 19 and has a housing 2 with a data acquisition element 8. A mobile reader 9''' which is used by a person, for example for inspection, for servicing or for monitoring the spindle 1, can be moved into the vicinity of the spindle 1 and can read, by radio, data acquisition elements 8 provided within the spindle 1. Furthermore, an external reader 9''' such as this can be fitted in the working area of the spindle 1 (for example in a machine hall), and the radio chips accommodated in the spindles can be read regularly for further evaluation, for example by transmitting them to a machine control center.

REFERENCE SYMBOLS

1 Spindle
2 Housing
3 Electric motor
4 Bearing
5 Bearing
6 Shaft
8 Data acquisition element
9 Reader/read element 10 Element for data acquisition
11 Tie rod
12 Stator
13 Rotor
15 Outer ring
16 Inner ring
17 Bearing cover
18 Boundary
19 Machine tool

The invention claimed is:

1. A motor spindle for a machine tool, the motor spindle having a housing for holding an electric motor and a shaft driven by the electric motor, having a tool holder for a tool for workpiece machining, and having at least one data acquisition element in order to receive at least one of operating data and state data relating to the motor spindle, wherein the at least one data acquisition element comprises a radio chip readable by radio via a read element;
   wherein the radio chip is within the motor spindle; and
   wherein the read element is arranged within the housing of the motor spindle for reading the radio chip within the motor spindle.

2. The motor spindle as claimed in claim 1, wherein the radio chip does not have its own power supply, and the radio chip is supplied with appropriate power for reading via the radio waves of the read element.

3. The motor spindle as claimed in claim 1, wherein the read element can be connected to a machine controller for the machine tool.

4. The motor spindle as claimed in claim 1, wherein the read element is intended to read the radio chip of the motor spindle and to read the radio chips of adjacent spindles.

5. The motor spindle as claimed in claim 1, wherein an external read element is provided in order to read the radio chip within the motor spindle.

6. The motor spindle as claimed in claim 5, wherein the radio chip has a data area which can be read only by the external read element and not by the read element arranged within the housing of the motor spindle.

7. The motor spindle as claimed in claim 5, wherein the motor spindle has a plurality of radio chips, some of which can be read by the read element arranged within the housing of the motor spindle, and some of which can be read by the external read element.

8. The motor spindle as claimed in claim 1, wherein the read element has a plurality of separate radio signals, which can be selected, in order to separately read different radio chips.

* * * * *